United States Patent
Giallorenzi

[11] 3,992,079
[45] Nov. 16, 1976

[54] FREQUENCY TUNABLE ACOUSTOOPTIC MODE FILTER

[75] Inventor: Thomas G. Giallorenzi, Springfield, Va.

[73] Assignee: The United States of America as represented by the Secretary of the Navy, Washington, D.C.

[22] Filed: Dec. 11, 1975

[21] Appl. No.: 639,681

[52] U.S. Cl. .......................... 350/96 C; 350/96 WG
[51] Int. Cl.[2] ........................................... G02B 5/14
[58] Field of Search ...................... 350/96 C, 96 WG

[56] References Cited
UNITED STATES PATENTS

| | | | |
|---|---|---|---|
| 3,904,270 | 9/1975 | Cheo | 350/96 WG |
| 3,920,314 | 11/1975 | Yajima | 350/96 C |

OTHER PUBLICATIONS

Burns et al., "Mode Conversion in Planar-Dielectric Separating Waveguide", *IEEE Journ of Quantum Elect.," vol. QE11, No. 1, Jan. 1973, pp. 32–39.*
Yajima "Dielectric thin–film Optical branching Waveguide "Appl Phys Lett. vol. 22 No. 12 June 1973.

*Primary Examiner*—John K. Corbin
*Assistant Examiner*—Stewart Levy
*Attorney, Agent, or Firm*—R. S. Sciascia; Philip Schneider; Melvin L. Crane

[57] ABSTRACT

A system using collinear acoustooptic interactions in optical waveguides through which waveguide mode conversion is achieved. The system involves a surface acoustic wave interaction with an optically guided wave and its operation for mode conversion.

6 Claims, 3 Drawing Figures

FREQUENCY TUNABLE ACOUSTOOPTIC MODE FILTER

BACKGROUND OF THE INVENTION

This invention relates to optical waveguides and more particularly to an acoustooptic filter or tunable coupler between optical waveguides.

Channel and branching waveguides have become important as a means of directing light in integrated optical circuits as well as in an electrooptic material if configured correctly. Examples of such guides are channel guides. In a channel guide light is confined in the vicinity of the channel. In order to form a modulator two channel guides must be brought in close proximity to each other so that the evanescent fields from the two guides overlap. In the overlay region, if an electric field is applied in a guide which exhibits an electrooptic effect, the power may be switched from one guide to the second guide. The principle of operation of such a device has been set forth in an article "Integrated Optics: An Introduction" by Steward E. Miller, *The Bell Technical Journal*, No. 48, pp. 2059–2069, Sept. 1969.

An electrooptic amplitude modulator using the branching guide has been set forth in patent application Ser. No. 553,053 filed Feb. 25, 1975 now U.S. Pat. No. 3,957,340. Both the channel and branching type modulators require that the substrate and/or film exhibit the electrooptic effect such as $LiNbO_3$, or quartz on $LiTaO_3$. Fabrication of waveguides using these materials presents difficulties particularly for the electrooptic films because they must be single crystals and single growth is hard to achieve. Waveguide fabrication involving metal indiffusion into ferroelectric substrates offer an alternate means of realizing electrooptic thin film guides. For waveguides using an electrooptic substrate the electric and optical field penetration into the substrate is small and reduces the figure of merit of such devices. This is not a serious problem however for indiffused guides. Even though these difficulties are present, the electrooptic modulator is an important element in many optical circuits. Further mode conversion behavior of branching or separating planar dielectric waveguides has been set forth in "Mode Conversion in Planar-Dielectric Separating Waveguides" by William K. Burns and A. Fenner Milton, IEEE Journal of Quantum Electronics Vol. QE-11, No. 1, Jan. 1975, pp. 32–39.

SUMMARY OF THE INVENTION

This invention involves a surface acoustic wave interaction with an optically guided wave which does not require fabrication in materials exhibiting the electrooptic effect. The arrangement of elements permits one to form an amplitude modulator, a tunable waveguide color filter, means for maximizing the collinear mode conversion process using a layered structure, a means of coupling and/or tuning coupled branching or channel waveguides, as well as coupled branching or channel guide tunable optical filters.

The combination of elements eliminates the need for external mode separating devices to separate converted and nonconverted modes in the acoustooptic collinear mode converter and provides means of maximizing the mode conversion process.

DETAILED DESCRIPTION

Figure 1:
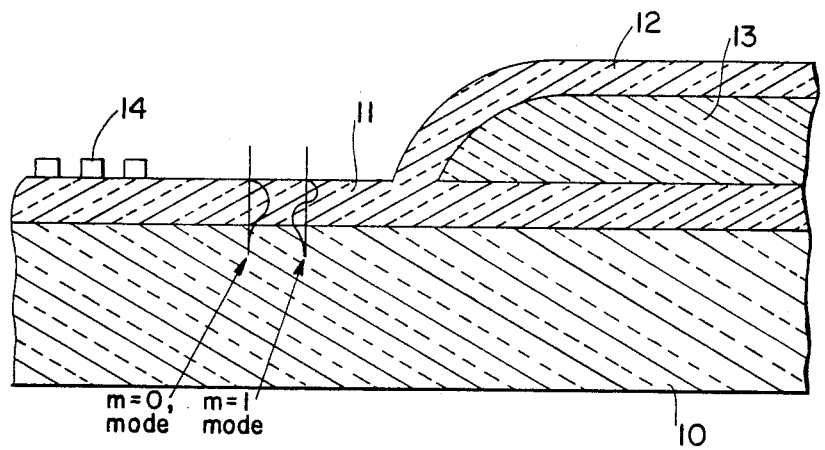
FIG. 1 is a cross sectional view of a waveguide structure

Now referring to the drawing there is shown an optical waveguide structure through which guided wave mode conversion is achieved. As shown in FIG. 1, the device includes a substrate 10 made of a dielectric such as $LiNbO_3$ having an index of refraction of $N_1$ where $N_1$ is from 2.19 to about 2.3. A thin film waveguide 11 of $As_2S_3$ having an index of refraction $N_2$ where $N_2$ is about 2.5 is formed onto the substrate where $N_1 < N_2$. The device includes a branching waveguide 12 which has an index of refraction $N_3$ which may have the same index of refraction as $N_2$ but must be greater than $N_1$.

The branching waveguide is separated from the main waveguide by a material 13 which has the same or lower index of refraction as that of the substrate. A surface acoustic wave transducer 14 is formed on the main waveguide, preceeding the branching waveguide. A suitable acoustical transducer is described in an article, "Optical Guided Wave Mode Conversion by an Acoustical Surface Wave" by L. Kuhn et al., *Applied Physics Letters* Vol. 19, No. 10, pp. 428–430, Nov. 15, 1971.

In operation without a surface acoustical wave. Optical radiation propagating in the main waveguide will propagate in the main lower waveguide if it is of a mode with an even modal number and will propagate in the branch if it is of a mode with an odd modal number as taught by Yajima. See "Dielectric Thin Film Optical Branching Waveguide" *Applied Physics Letters*, Vol. 22, page 6474, 1973. In the above described device, consider a $M = 0$ mode incident from the left end with the acoustical transducer thereon. In the absence of an acoustical wave, the wave propagates in the lower branch. With an acoustical wave launched, the acoustical wave travels along the surface of the waveguide structure and extends approximately one acoustic wavelength into the structure thereby converting the $M = 0$ mode to a $M = 1$ mode provided of course that phase matching conditions are satisfied. The $M = 1$ mode then propagates in the branching waveguide. Thus, amplitude modulation of the incident mode is obtained.

In order to couple different modes out of the device, it is necessary to vary the acoustic wavelength of the transducer. Thus by varying the acoustical wavelength, the various input modes can be electrically scanned. Furthermore, if there is an input mode with a large optical bandwidth, incident in a given mode, M, then by varying the acoustical frequency output of the transducer a given optical frequency may be selectively switched out. Therefore the color of the light in each waveguide can be electrically controlled.

Figure 2:
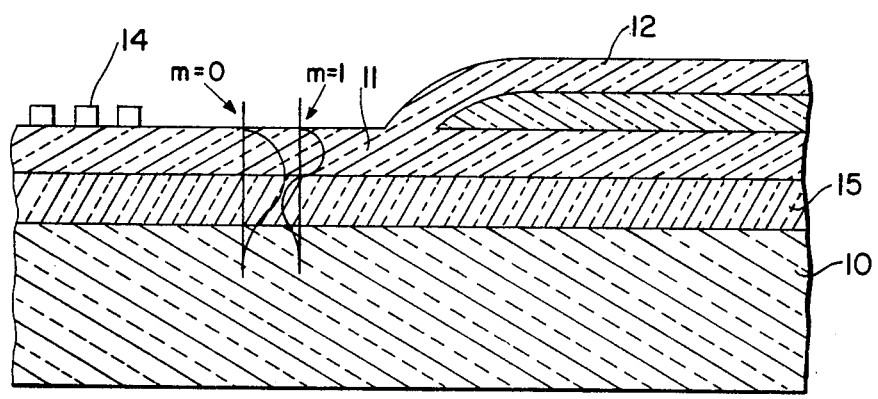
FIGS. 2 and 3 are modifications of the structure of FIG. 1.

The mode conversion of the device may be increased by maximizing the overlay integrals. This may be done by the device shown in FIG. 2. As shown, instead of containing one main waveguide, another waveguide 15 is formed between the main waveguide 11 and the substrate. Thus, the device is structurally the same as that of FIG. 1 with the additional waveguide. The device shown by FIG. 2 includes a $LiTaO_3$ substrate with $LiNbO_3$ film on the substrate and an $AsS_3$ film on the LiNbO₃ film. The branching waveguide is formed of AsS₃. These materials are representative and are used because it is necessary for the two waveguide layers to be acoustooptically non-equivalent, with the photoelectric constant of the layers different from each other. Other film substrate combinations can be used, the choice of materials being determined by use of materials which have the largest difference in photoelastic coefficients between the waveguide films. Of course the materials must be suitable for waveguide structures. To make the layers optically non-equivalent, either the indicies of refraction or the thickness of the film may be varied. By using such a structure, the mode conversion process can be maximized. The structure, of FIG. 2 includes an optical transducer such as shown in FIG. 1 and operates in the manner as described for the operation of the device of FIG. 1. By use of a double layer waveguide as shown in FIG. 2, the mode conversion may be increased over that of the structure of FIG. 1.

Figure 3:
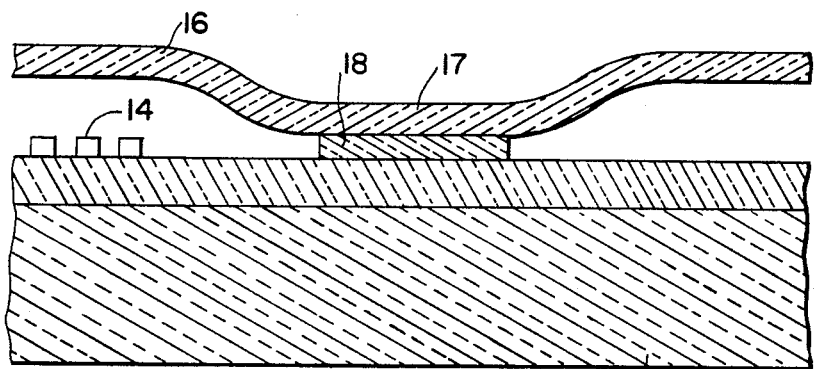

FIG. 3 illustrates another modification, one in which two waveguides are brought together so that an interaction takes place in a region in which the two waveguides parallel each other in a close proximity. As shown, the structure includes a substrate upon which a waveguide layer is formed. The waveguide has an acoustical transducer thereon as in the devices of FIGS. 1 and 2. A second waveguide 16 spaced from the first waveguide with a close proximity along a portion 17 parallel thereto curves away from the first waveguide so that the two waveguides are separate. The close parallel portion is separated from the first waveguide by an optical material 18 which has a smaller index of refraction than that of both waveguides. The index of refraction of the spacer material may be the same as that of the substrate.

In the modification of FIG. 3, an acoustical wave is transmitted along the waveguide surface and propagates in the vicinity of both waveguides. Optical radiation incident in either or both waveguides is guided into the close parallel region where fields in the waveguides interact.

In this device for power transfer to occur, both guides must be phase-matched. If they are not phase-matched there is little or no power transfer between the guides. In the structure of FIG. 3, the acoustic wave can be utilized to phase-match both guides causing power transfer between the guides. As the acoustic frequency of the transducer is changed, one can go from a matched situation to a non-phase-matched situation, thus the power transfer between the double waveguides may be electronically controlled. Further, if a range of optical wavelengths are propagated, changing the acoustic frequency will permit electrical coupling of different optical wavelengths from one guide to the other. Therefore the structure set forth in FIG. 3 may be used as an optical filter.

The combination of branching waveguides and collinear acoustooptic scattering resulting from the various modifications shown and described herein form an amplitude modulator, a tunable waveguide color filter, means for coupling and/or tuning coupled branching or channel waveguides, as well as coupled branching or channel guide tunable optical filters. Further, the structure provides a means for maximizing the collinear mode conversion process by using a layered structure without the necessity of metal films on the other surface in the area of the conversion.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical waveguide structure for co-linear acoustooptic interactions through which guided wave mode conversion and coupling is achieved; which comprises,
    an optical material substrate,
    an optical waveguide formed upon said substrate,
    a mode separating optical waveguide formed on and along a portion of said optical waveguide and,
    a surface acoustic wave transducer formed on said optical waveguide for producing a surface acoustic wave which travels along the upper surface of said optical waveguide and extends approximately one acoustic wavelength into said optical waveguide.

2. An optical waveguide structure as claimed in claim 1 wherein,
    said mode separating optical waveguide is a branching waveguide.

3. An optical waveguide structure as claimed in claim 2 wherein,
    said branching waveguide has a large taper slope.

4. An optical waveguide structure as claimed in claim 1; wherein,
    said optical waveguide comprises a double material, doubled layered optical waveguide in combination with a branching waveguide.

5. An optical waveguide structure as claimed in claim 4; wherein,
    said branching waveguide has a large taper slope.

6. A mode converting structure as claimed in claim 1; which includes,
    two parallel waveguides brought into close proximity to each other by means of curved guide sections and modes in these two guides are coupled together by means of overlapping fields and are phase matched by means of an acoustic surface wave produced by said transducer.

* * * * *